United States Patent
Ichikawa et al.

(10) Patent No.: US 9,831,917 B2
(45) Date of Patent: Nov. 28, 2017

(54) ELECTRIC FIELD COUPLING TYPE WIRELESS ELECTRIC POWER TRANSMITTING SYSTEM AND ELECTRIC POWER RECEIVING APPARATUS INCLUDED IN THE SAME

(71) Applicant: MURATA MANUFACTURING CO., LTD., Nagaokakyo-Shi, Kyoto-Fu (JP)

(72) Inventors: Keiichi Ichikawa, Nagaokakyo (JP); Hironobu Takahashi, Kyoto-Fu (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 661 days.

(21) Appl. No.: 14/465,144

(22) Filed: Aug. 21, 2014

(65) Prior Publication Data

US 2014/0361639 A1    Dec. 11, 2014

Related U.S. Application Data

(63) Continuation of application No. PCT/JP2012/078389, filed on Nov. 1, 2012.

(30) Foreign Application Priority Data

Mar. 26, 2012 (JP) .................................. 2012-069819

(51) Int. Cl.
*H04B 5/00* (2006.01)
*H02H 9/04* (2006.01)
(Continued)

(52) U.S. Cl.
CPC ........... *H04B 5/0012* (2013.01); *H02H 9/001* (2013.01); *H02H 9/04* (2013.01); *H02J 7/025* (2013.01); *H02J 17/00* (2013.01); *H02J 7/0042* (2013.01)

(58) Field of Classification Search
CPC ........ H04B 5/0012; H02J 7/025; H02J 17/00; H02J 7/0042; H02H 9/001; H02H 9/04
See application file for complete search history.

(56) References Cited

U.S. PATENT DOCUMENTS 8,421,272 B2 * 4/2013 Kubono .................. H02J 17/00
                                                                  307/104
8,552,596 B2   10/2013 Ichikawa et al.
(Continued)

FOREIGN PATENT DOCUMENTS

CN        201185355 Y     1/2009
CN        102386682 A     3/2012
(Continued)

OTHER PUBLICATIONS

International Search Report and Written Opinion of PCT/JP2012/078389, dated Jan. 29, 2013.

*Primary Examiner* — Jared Fureman
*Assistant Examiner* — Michael Warmflash
(74) *Attorney, Agent, or Firm* — Arent Fox LLP

(57) ABSTRACT

An electric power receiving apparatus of an electric power transmitting system includes an overvoltage suppressing unit connected in parallel to a resonant circuit. The overvoltage suppressing unit is formed by an impedance element. Impedance of the impedance element is set to such a value that a rise in a voltage across at least one pair of electric power receiving electrodes is suppressed as compared to a case in which the impedance element is not connected, in the process in which coupling capacitance Cm between electric power transmitting electrodes and the electric power receiving electrodes changes from a value held while the electric power transmitting electrodes and the electric power receiving electrodes are in a predetermined positional relationship during normal electric power transmission to substantially zero.

18 Claims, 13 Drawing Sheets

(51) Int. Cl.
*H02J 17/00* (2006.01)
*H02H 9/00* (2006.01)
*H02J 7/02* (2016.01)
*H02J 7/00* (2006.01)

(56) References Cited

U.S. PATENT DOCUMENTS

| | | | |
|---|---|---|---|
| 2009/0302690 A1 | 12/2009 | Kubono | |
| 2010/0213770 A1* | 8/2010 | Kikuchi | H01Q 1/248 307/104 |
| 2012/0038218 A1* | 2/2012 | Ichikawa | H02J 5/005 307/97 |
| 2012/0050931 A1* | 3/2012 | Terry | H02H 9/04 361/91.5 |
| 2012/0299392 A1 | 11/2012 | Ichikawa et al. | |
| 2012/0299397 A1* | 11/2012 | Ichikawa | H02J 5/00 307/149 |

FOREIGN PATENT DOCUMENTS

| | | |
|---|---|---|
| EP | 2579426 A1 | 4/2013 |
| GB | 2321726 A | 8/1998 |
| JP | 2001-268823 A | 9/2001 |
| JP | 2009-118587 A | 5/2009 |
| JP | 201239800 A | 2/2012 |
| WO | WO-2011-148803 A1 | 12/2011 |

\* cited by examiner

PRIOR ART

ELECTRIC FIELD COUPLING TYPE WIRELESS ELECTRIC POWER TRANSMITTING SYSTEM AND ELECTRIC POWER RECEIVING APPARATUS INCLUDED IN THE SAME

CROSS REFERENCE TO RELATED APPLICATIONS

The present application is a continuation of PCT/JP2012/078389 filed Nov. 1, 2012, which claims priority to Japanese Patent Application No. 2012-069819, filed Mar. 26, 2012, the entire contents of each of which are incorporated herein by reference.

FIELD OF THE INVENTION

The present invention relates to electric field coupling type wireless electric power transmitting systems and electric power receiving apparatuses included in the electric field coupling type wireless electric power transmitting systems.

BACKGROUND OF THE INVENTION

In recent years, wireless electric power transmitting systems that wirelessly supply electric power to portable devices, such as a smartphone and a laptop personal computer, have been put to practical use. Such wireless electric power transmitting systems include, for example, those described in Patent Document 1 and Patent Document 2.

Patent Document 1 discloses an electromagnetic induction type wireless electric power transmitting system. The electromagnetic induction type wireless electric power transmitting system includes an electric power transmitting apparatus and an electric power receiving apparatus. The electric power transmitting apparatus includes an electric power transmitting coil, and the electric power receiving apparatus includes an electric power receiving coil. Electric power is thus transmitted between these coils through electromagnetic induction.

Patent Document 2 discloses an electric field coupling type wireless electric power transmitting system. The electric field coupling type wireless electric power transmitting system includes an electric power transmitting apparatus and an electric power receiving apparatus. The electric power transmitting apparatus includes an electric power transmitting electrode, and the electric power receiving apparatus includes an electric power receiving electrode. Electric power is thus transmitted between these electrodes through electrostatic induction.

FIG. 11 is an equivalent circuit diagram of the electric field coupling type wireless electric power transmitting system disclosed in Patent Document 2. This electric field coupling type wireless electric power transmitting system includes an electric power transmitting apparatus 1101 and an electric power receiving apparatus 1201, and electric power is transmitted through coupling capacitance Cm between capacitance C1 of the electric power transmitting apparatus 1101 and capacitance C2 of the electric power receiving apparatus 1201. The electric power transmitting apparatus 1101 includes an LC resonant circuit formed by an inductor L1 and the capacitance C1, and the electric power receiving apparatus 1201 includes an LC resonant circuit formed by an inductor L2 and the capacitance C2. In this wireless electric power transmitting system, two resonant frequencies are generated when the electric power transmitting apparatus 1101 and the electric power receiving apparatus 1201 are coupled so as to couple the two resonant circuits. An operating frequency (electric power transmitting frequency) of a voltage generator 11 of the electric power transmitting system is set to a frequency that is intermediate between these resonant frequencies.

Patent Document 1: Japanese Unexamined Patent Application Publication No. 2009-118587

Patent Document 2: International Publication No. WO2011/148803

With the electric field coupling type wireless electric power transmitting system as disclosed in Patent Document 2, the electric power receiving apparatus may be damaged if the electric power receiving apparatus is removed from the electric power transmitting apparatus while the electric power receiving apparatus is placed on the electric power transmitting apparatus so as to transmit electric power.

SUMMARY OF THE INVENTION

The present invention is directed to providing an electric field coupling type wireless electric power transmitting system and an electric power receiving apparatus that can prevent the electric power receiving apparatus from being damaged even if, for some reason, the electric power receiving apparatus is removed from the electric power transmitting apparatus during electric power transmission.

In order to solve the problem described above, the inventors of the present invention have investigated what causes a damage to an electric power receiving apparatus when the electric power receiving apparatus is removed from an electric power transmitting apparatus and have reached the following findings.

FIG. 12 illustrates changes in frequency characteristics of a voltage across an electric power receiving apparatus side active electrode and an electric power receiving apparatus side passive electrode (hereinafter, referred to as a "voltage across electric power receiving electrodes," as appropriate) and of a voltage across an electric power transmitting apparatus side active electrode and an electric power transmitting apparatus side passive electrode (hereinafter, referred to as a "voltage across electric power transmitting electrodes," as appropriate) in the process of removing an electric power receiving apparatus from an electric power transmitting apparatus in an existing electric field coupling type wireless electric power transmitting system. Specifically, FIG. 12(a) illustrates the frequency characteristics in a state in which the electric power receiving apparatus is placed on the electric power transmitting apparatus (normal usage state). FIG. 12(b) illustrates the frequency characteristics of the voltage across the electric power transmitting electrodes and the voltage across the electric power receiving electrodes in a state in which the electric power receiving apparatus starts to be removed from the electric power transmitting apparatus. FIG. 12(c) illustrates the frequency characteristics of the voltage across the electric power transmitting electrodes and the voltage across the electric power receiving electrodes in a state in which the electric power receiving apparatus has further been removed from the electric power transmitting apparatus than in a state illustrated in FIG. 12(b). In FIGS. 12(a), 12(b), and 12(c), solid lines A, A', and A" indicate the frequency characteristics of the voltage across the electric power receiving electrodes, and broken lines B, B', and B" indicate the frequency characteristics of the voltage across the electric power transmitting electrodes. It should be noted that the solid lines A, A', and A" and the broken lines B, B', and B" indicate the frequency characteristics in a state in which a secondary battery is substantially fully charged and load impedance is high. Meanwhile, a dashed dotted line C illustrated in FIG. 12(a) indicates the frequency characteristics of the voltage across the electric power receiving electrodes in a state in which the secondary battery has hardly been charged and the load impedance is low. Illustration of the characteristics corresponding thereto is omitted in FIGS. 12(b) and 12(c).

As can be understood from FIG. 12(a), the voltage across the electric power transmitting electrodes and the voltage across the electric power receiving electrodes are higher in a state in which the secondary battery is substantially fully charged and the load impedance is high than in a state in which the secondary battery has not been charged.

In addition, as illustrated in FIGS. 12(a), 12(b), and 12(c), the voltage across the electric power transmitting electrodes and the voltage across the electric power receiving electrodes each have two peaks at mutually different frequencies. This is because, when the electric power transmitting electrode and the electric power receiving electrode are made to undergo capacitive coupling by matching the resonant frequencies of the resonant circuits included in the electric power transmitting apparatus and the electric power receiving apparatus, two resonances occur at a high frequency side and a low frequency side of the frequency, and the frequency of each peak corresponds to each resonant frequency thereof. These peaks (resonant frequencies) shift toward the high frequency side as the electric power receiving apparatus is moved further away from the electric power transmitting apparatus, or in other words, as the distance between the electric power receiving apparatus and the electric power transmitting apparatus increases, as can be seen from FIGS. 12(a), 12(b), and 12(c). In this manner, it is considered that the reason why each peak (resonant frequency) shifts toward the high frequency side is that the coupling capacitance Cm between the electric power transmitting electrode of the electric power transmitting apparatus and the electric power receiving electrode of the electric power receiving apparatus decreases as the distance between the electric power receiving apparatus and the electric power transmitting apparatus increases.

In FIGS. 12(a), 12(b), and 12(c), f1, f1', and f1" indicate the low frequency side resonant frequencies of the voltage across the electric power receiving electrodes, and f2, f2', and f2" indicate the high frequency side resonant frequencies of the voltage across the electric power receiving electrodes. In addition, f3 indicates an operating frequency (electric power transmitting frequency) of the electric power transmitting apparatus. The operating frequency f3 is the electric power transmitting frequency (operating frequency) of the electric power transmitting apparatus, and is set to a frequency intermediate between the low frequency side resonant frequency f1 and the high frequency side resonant frequency f2 in a state illustrated in FIG. 12(a).

As can be seen from FIGS. 12(a), 12(b), and 12(c), the low frequency side resonant frequency of the voltage across the electric power receiving electrodes continuously shifts toward the high frequency side as in f1, f1', and f1", as the electric power receiving apparatus is removed and moved away from the electric power transmitting apparatus. During that time, as illustrated in FIG. 12(c), there is an occasion at which the low frequency side resonant frequency f1" coincides with the operating frequency f3, and, at the time, the voltage generated in the electric power receiving apparatus becomes extremely high, which in turn may cause a damage to the electric power receiving apparatus. FIG. 13 illustrates a change in the voltage across the electric power receiving electrodes in relation to a change in the coupling capacitance Cm occurring as the electric power receiving apparatus is removed from the electric power transmitting apparatus. As the coupling capacitance Cm decreases as the electric power receiving apparatus is moved away from the electric power transmitting apparatus, the resonant frequencies f1 and f2 change, as described above. As a result, the voltage across the electric power receiving electrodes temporarily becomes high at the coupling capacitance Cm in the vicinity of the coupling capacitance where the low frequency side resonant frequency overlaps the operating frequency, and then decreases. In this manner, there is a case in which a high voltage across the electric power receiving electrodes (overvoltage) is applied across the electric power receiving electrodes if the electric power receiving apparatus is suddenly removed from the electric power transmitting apparatus during electric power transmission and the distance between the electric power receiving apparatus and the electric power transmitting apparatus increases. For example, if the coupling capacitance Cm changes from Cm1 to Cm2 and the voltage across the electric power receiving electrodes in turn exceeds a withstanding voltage Vs, the electric power receiving apparatus may be damaged. The above is what is considered to cause a damage to the electric power receiving apparatus. In this manner, the present inventors have considered that a high voltage occurring in the electric power receiving apparatus as the coupling capacitance changes due to the electric power receiving apparatus being removed from the electric power transmitting apparatus causes the damage to the electric power receiving apparatus. Therefore, the present inventors have devised an electric power receiving apparatus and an electric power transmitting system that have an impedance element connected in parallel to a resonant circuit of the electric power receiving apparatus so as to be capable of shifting a resonant frequency and so on and that have configurations described hereinafter.

An electric power receiving apparatus of the present invention receives electric power transmitted wirelessly from an electric power transmitting apparatus, and the electric power transmitting apparatus includes a power supply circuit that generates an alternate current voltage of a predetermined frequency, at least one pair of electric power transmitting electrodes, and a resonant circuit that is connected between the power supply circuit and the at least one pair of electric power transmitting electrodes and that applies the alternate current voltage across the at least one pair of electric power transmitting electrodes. The electric power receiving apparatus includes a load circuit, at least one pair of electric power receiving electrodes provided in correspondence with the at least one pair of electric power transmitting electrodes of the electric power transmitting apparatus so as to generate coupling capacitance in accordance with a positional relationship with the at least one pair of electric power transmitting electrodes, a resonant circuit connected between the load circuit and the at least one pair of electric power receiving electrodes so as to apply the alternate current voltage to the load circuit, and an overvoltage suppressing unit connected in parallel to the resonant circuit of the electric power receiving apparatus. The overvoltage suppressing unit is formed by an impedance element, and the impedance of the impedance element is set to such a value that a rise in a voltage across the at least one pair of electric power receiving electrodes is suppressed as compared to a case in which the impedance element is not connected, in the process in which the coupling capacitance between the electric power transmitting electrodes and the electric power receiving electrodes changes from a value held while the electric power transmitting electrodes and the electric power receiving electrodes are in a predetermined positional relationship during normal electric power transmission to substantially 0.

An electric power transmitting system of the present invention includes an electric power transmitting apparatus and the electric power receiving apparatus of the present invention. The electric power transmitting apparatus includes a power supply circuit that generates an alternate current voltage of a predetermined frequency, at least one pair of electric power transmitting electrodes, and a resonant circuit that is connected between the power supply circuit and the at least one pair of electric power transmitting electrodes and that applies the alternate current voltage across the at least one pair of electric power transmitting electrodes.

According to the electric power transmitting system and the electric power receiving apparatus of the present invention, even in a case in which the electric power receiving apparatus is removed from the electric power transmitting apparatus during electric power transmission, a high voltage across the electric power receiving electrodes at the resonant frequency is not applied to the load circuit. Accordingly, the electric power receiving apparatus and the load circuit included in the electric power receiving apparatus can be prevented from being damaged due to an overvoltage.

BRIEF DESCRIPTION OF DRAWINGS

FIG. 3(a) illustrates a comparison of the characteristics in cases where a capacitor, serving as an overvoltage suppressing unit, is provided and is not provided, and FIG. 3(b) illustrates a change in the resonant frequency occurring when the electric power receiving apparatus is removed from the electric power transmitting apparatus, in a case in which the capacitor is provided.

FIG. 5(a) illustrates a comparison of the characteristics in cases where an inductor, serving as an overvoltage suppressing unit, is provided and is not provided, and FIG. 5(b) illustrates a change in the resonant frequency occurring when the electric power receiving apparatus is removed from the electric power transmitting apparatus in a case in which the inductor is provided.

FIG. 12(a) illustrates the frequency characteristics in a state in which the electric power receiving apparatus is placed on the electric power transmitting apparatus. FIG. 12(b) illustrates the frequency characteristics of the voltage across the electric power transmitting electrodes and of the voltage across the electric power receiving electrodes in a state in which the electric power receiving apparatus starts to be removed from the electric power transmitting apparatus. FIG. 12(c) illustrates the frequency characteristics of the voltage across the electric power transmitting electrodes and of the voltage across the electric power receiving electrodes in a state in which the electric power receiving apparatus has further been removed from the electric power transmitting apparatus than in a state illustrated in FIG. 12(b).

DETAILED DESCRIPTION OF THE PREFERRED EMBODIMENTS

Embodiment 1

1. Configuration

Figure 1:
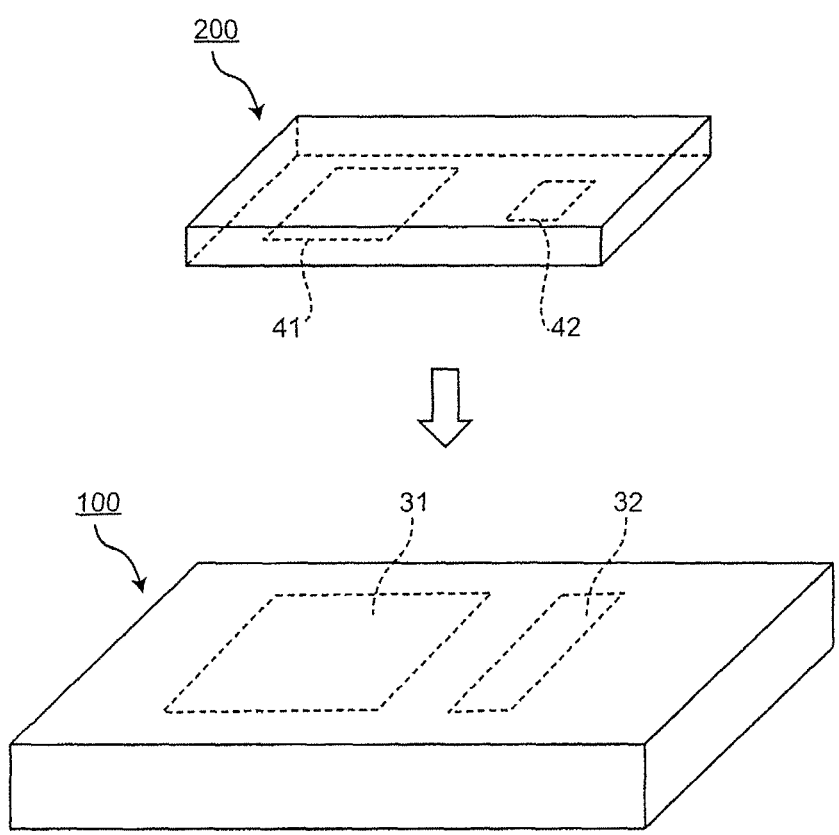
FIG. 1 is a perspective view of an electric power transmitting apparatus and an electric power receiving apparatus according to Embodiment 1.

FIG. 1 is a perspective view of an electric power transmitting apparatus 100 and an electric power receiving apparatus 200 forming an electric field coupling type wireless electric power transmitting system according to Embodiment 1.

The electric power transmitting apparatus 100 includes an electric power transmitting apparatus side passive electrode 31 and an electric power transmitting apparatus side active electrode 32, and the electric power receiving apparatus 200 includes an electric power receiving apparatus side passive electrode 41 and an electric power receiving apparatus side active electrode 42.

When the electric power receiving apparatus 200 is placed on the electric power transmitting apparatus 100, the electric power transmitting apparatus side passive electrode 31 faces the electric power receiving apparatus side passive electrode 41, and the electric power transmitting apparatus side active electrode 32 faces the electric power receiving apparatus side active electrode 42. At this point, coupling capacitance Cm is generated between the electric power transmitting apparatus side passive electrode 31 and electric power transmitting apparatus side active electrode 32 and the electric power receiving apparatus side passive electrode 41 and electric power receiving apparatus side active electrode 42. The electric power transmitting apparatus 100 wirelessly transmits electric power to the electric power receiving apparatus 200 through electric field coupling involving the coupling capacitance Cm.

Figure 2:
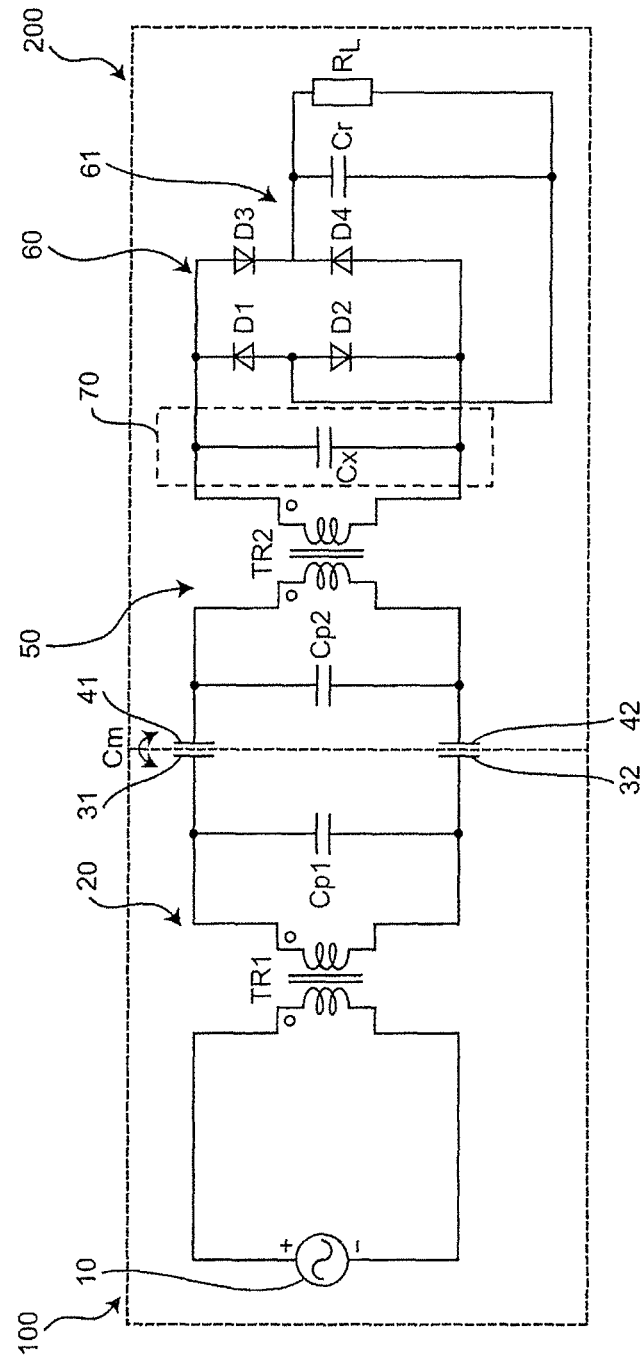
FIG. 2 illustrates a circuit configuration of a wireless electric power transmitting system according to Embodiment 1.

FIG. 2 illustrates a circuit configuration of the wireless electric power transmitting system according to Embodiment 1.

The electric power transmitting apparatus 100 includes a power supply circuit 10, an electric power transmitting apparatus side resonant circuit 20, the electric power transmitting apparatus side passive electrode 31, and the electric power transmitting apparatus side active electrode 32.

The power supply circuit 10 generates an alternate current voltage of a predetermined frequency. The predetermined frequency is set with the efficiency of electric power transmission from the electric power transmitting apparatus 100 to the electric power receiving apparatus 200, its relationship with the resonant frequency in the wireless electric power transmitting system, and so on taken into consideration. For example, the predetermined frequency is set to, but is not limited to, a high frequency from a range between 100 kHz to a several tens of MHz.

The electric power transmitting apparatus side resonant circuit 20 is connected between the power supply circuit 10 and the electric power transmitting apparatus side passive electrode 31 and electric power transmitting apparatus side active electrode 32.

A step-up transformer TR1 steps up a voltage generated by the power supply circuit 10 and applies the stepped up voltage across the electric power transmitting apparatus side passive electrode 31 and the electric power transmitting apparatus side active electrode 32. The step-up transformer TR1 is provided so as to improve the efficiency of electric power transmission through electric field coupling.

A capacitor Cp1 is connected between the electric power transmitting apparatus side passive electrode 31 and the electric power transmitting apparatus side active electrode 32 so as to short-circuit output ends of the step-up transformer TR1. The capacitor Cp1 may be provided in the form of a component, or may be formed by parasitic capacitance of a wire or the like included in the electric power transmitting apparatus 100. At the electric power transmission side, an inductance component (leakage inductance) of the step-up transformer TR1 and capacitance including the capacitor Cp1 form the electric power transmitting apparatus side resonant circuit 20.

The electric power receiving apparatus 200 includes the electric power receiving apparatus side passive electrode 41, the electric power receiving apparatus side active electrode 42, an electric power receiving apparatus side resonant circuit 50, and a load circuit 60.

The electric power receiving apparatus side passive electrode 41 and the electric power receiving apparatus side active electrode 42 receive electric power from the electric power transmitting apparatus side passive electrode 31 and the electric power transmitting apparatus side active electrode 32 through the coupling capacitance Cm.

The load circuit 60 includes a rectifying circuit 61 that includes diodes D1 to D4 and a ripple removing capacitor Cr, and a load RL connected to a secondary side of the rectifying circuit 61. The load RL is a secondary battery to be charged with rectified electric power in the present embodiment. The secondary battery has such characteristics that the impedance thereof increases as the secondary battery approaches a fully charged state.

The electric power receiving apparatus side resonant circuit 50 is connected between the load circuit 60 and the electric power receiving apparatus side passive electrode 41 and electric power receiving apparatus side active electrode 42. The electric power receiving apparatus side resonant circuit 50 includes a step-down transformer TR2 and a capacitor Cp2.

The step-down transformer TR2 steps down a voltage across the electric power receiving apparatus side passive electrode 41 and the electric power receiving apparatus side active electrode 42 (hereinafter, referred to as a "voltage across the electric power receiving electrodes," as appropriate) and applies the stepped down voltage to the load circuit 60. The step-down transformer TR2 is provided so as to improve the efficiency of electric power transmission through the electric field coupling, in collaboration with the step-up transformer TR1.

The capacitor Cp2 is connected between the electric power receiving apparatus side passive electrode 41 and the electric power receiving apparatus side active electrode 42. The capacitor Cp2 may be provided in the form of a component, or may be formed by parasitic capacitance of a wire or the like included in the electric power receiving apparatus 200. At the electric power reception side, an inductance component of the step-down transformer TR2 and capacitance including the capacitor Cp2 form the electric power receiving apparatus side resonant circuit 50.

In particular, in the present embodiment, an overvoltage suppressing unit 70 is provided so as to suppress a rise in a voltage of received electric power occurring as the electric power receiving apparatus 200 is removed from the electric power transmitting apparatus 100. The overvoltage suppressing unit 70 is provided in parallel to the electric power receiving apparatus side resonant circuit 50, or in other words, provided so as to short-circuit output ends of the step-down transformer TR2. The overvoltage suppressing unit 70 is formed by an impedance element. The impedance of the impedance element is set to such a value that a rise in the voltage across the pair of the electric power receiving apparatus side passive electrode 41 and the electric power receiving apparatus side active electrode 42 is suppressed as compared to a case in which the impedance element is not connected.

In the present embodiment, the overvoltage suppressing unit 70 is formed by a capacitor Cx. The capacitor Cx prevents a low frequency side resonant frequency from overlapping an operating frequency so as to suppress occurrence of a high voltage in the electric power receiving apparatus 200.

2. Capacitor Cx Serving as Overvoltage Suppressing Unit

The capacitor Cx serving as the overvoltage suppressing unit 70 will be described. The capacitor Cx shifts, of two resonant frequencies generated as the electric power transmitting apparatus side resonant circuit 20 and the electric power receiving apparatus side resonant circuit 50 undergo capacitive coupling through the coupling capacitance, a low frequency side resonant frequency toward the low frequency side by a predetermined shift amount. The capacitance of the capacitor Cx is set to such a value that the low frequency side resonant frequency is shifted toward the low frequency side by the predetermined shift amount. In the present embodiment, the predetermined shift amount is set to such an amount that the low frequency side resonant frequency does not overlap the operating frequency f3 even if the low frequency side resonant frequency moves in the process of removing the electric power receiving apparatus 200 placed on the electric power transmitting apparatus 100 so as to be sufficiently spaced apart from the electric power transmitting apparatus 100.

Specifically, the capacitance of the capacitor Cx is set to such a value that neither of the low frequency side and high frequency side resonant frequencies generated in the electric power receiving apparatus side resonant circuit 50 overlaps the operating frequency f3 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in a predetermined positional relationship during normal electric power transmission to substantially 0. The low frequency side resonant frequency generated when the electric power transmitting electrodes 31 and 32 and the electric power receiving electrodes 41 and 42 are made to undergo capacitive coupling is denoted by f1, the high frequency side resonant frequency is denoted by f2, and the operating frequency is denoted by f3. The capacitance of the capacitor Cx is set so as to satisfy the relationship of f1<f3<f2 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in the predetermined positional relationship during normal electric power transmission to substantially 0. Here, the coupling capacitance Cm between the electric power transmitting electrodes 31 and 32 and the electric power receiving electrodes 41 and 42 being substantially 0 indicates that the coupling capacitance Cm is an infinitely small value.

It should be noted that the assumption in the present embodiment is that the electric power receiving apparatus 200 is placed on the electric power transmitting apparatus 100 at a predetermined position while electric power is transmitted from the electric power transmitting apparatus 100 to the electric power receiving apparatus 200, and the positional relationship of the electric power transmitting apparatus and the electric power receiving apparatus held at that point is referred to as the predetermined positional relationship during normal electric power transmission. The predetermined positional relationship is not limited to the above. For example, even if the electric power receiving apparatus 200 is not placed on the electric power transmitting apparatus 100 at the predetermined position, it is sufficient as long as the electric power receiving apparatus 200 and the electric power transmitting apparatus 100 are in a predetermined positional relationship and the electric power transmitting electrodes 31 and 32 of the electric power transmitting apparatus 100 and the electric power receiving electrodes 41 and 42 of the electric power receiving apparatus 200 are thus in a predetermined positional relationship during normal electric power transmission. The same applies in Embodiments 2 to 5.

In addition, the predetermined shift amount is not limited to the value described above. For example, if, by shifting the low frequency side resonant frequency toward the low frequency side by a predetermined shift amount, the voltage of electric power received when the low frequency side resonant frequency overlaps the operating frequency f3 in the process of removing the electric power receiving apparatus 200 placed on the electric power transmitting apparatus 100 so as to be sufficiently spaced apart from the electric power transmitting apparatus 100 becomes such a low voltage that does not cause a damage to the electric power receiving apparatus 200, that shift amount may be set as the predetermined shift amount.

Figure 3:
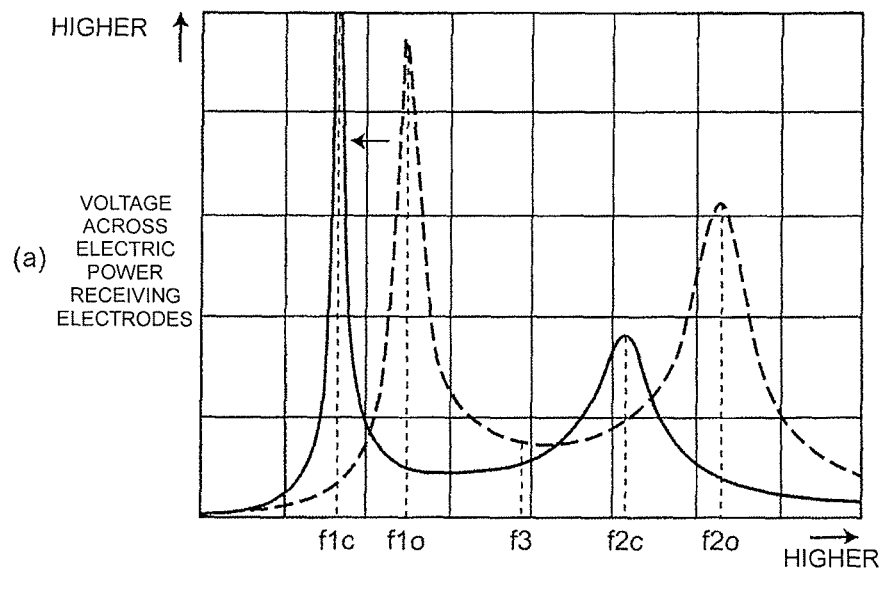
FIG. 3 illustrates an example of frequency characteristics of a voltage across an electric power receiving apparatus side active electrode and an electric power receiving apparatus side passive electrode in a state in which load impedance is high in the wireless electric power transmitting system according to Embodiment 1.
Figure 3:
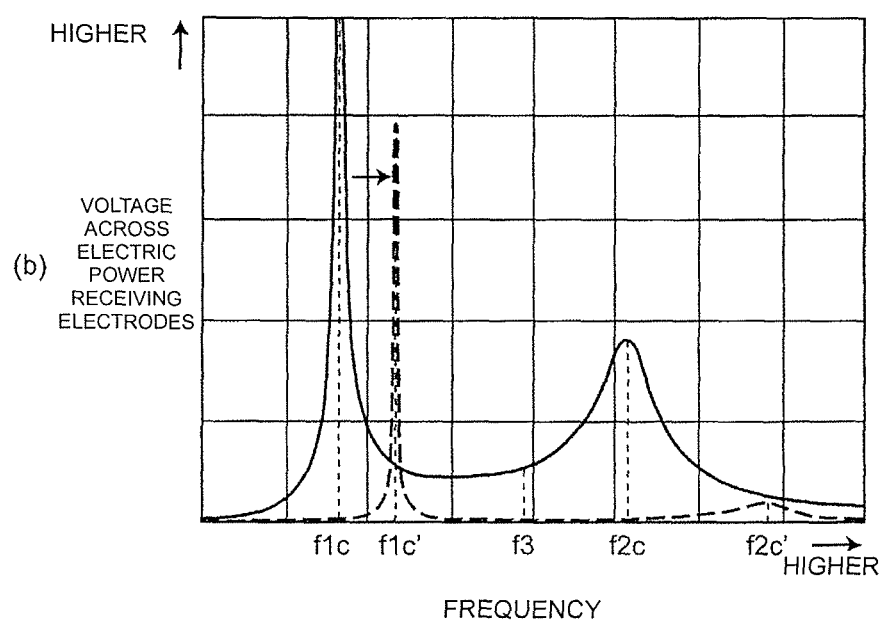

A specific example in which the capacitance of the capacitor Cx is set so as to satisfy the relationship of f1<f3<f2 will be described with reference to FIG. 3. FIG. 3 illustrates an example of the frequency characteristics of the voltage across the electric power receiving apparatus side active electrode 42 and the electric power receiving apparatus side passive electrode 41 in a state in which the secondary battery is substantially fully charged and the load impedance is high. Specifically, FIG. 3(a) illustrates a comparison of the characteristics in cases where the capacitor Cx, serving as the overvoltage suppressing unit 70, is provided and is not provided, in which the solid line indicates the case in which the capacitor Cx is provided, and the broken line indicates the case in which the capacitor Cx is not provided. The low frequency side and high frequency side resonant frequencies are, respectively, f1o and f2o when the capacitor Cx is not provided, but are, respectively, f1c and f2c, which are lower than f1o and f2o, when the capacitor Cx is provided. In other words, the resonant frequencies shift toward the low frequency side when the capacitor Cx is provided. At this point, the operating frequency f3 is at a position intermediate between the two resonant frequencies f1c and f2c, namely, in an area in which a change in the voltage across the electric power receiving electrodes is small. Thus, even if the coupling capacitance Cm changes to some extent as the position at which the electric power receiving apparatus 200 is placed on the electric power transmitting apparatus 100 shifts and the frequency characteristics of the voltage across the electric power receiving electrodes thus change to some extent, the variation in the voltage across the electric power receiving electrodes is small, and thus electric power can be transmitted stably. In addition, the voltage across the electric power receiving electrodes in this intermediate area is equal to or greater than a prescribed voltage that is required to transmit electric power efficiently, and thus electric power can be transmitted efficiently.

FIG. 3(b) illustrates a change in the resonant frequency while the electric power receiving apparatus 200 is removed from the electric power transmitting apparatus 100 in a case in which the capacitor Cx is provided. The solid line indicates a case before the electric power receiving apparatus 200 is removed from the electric power transmitting apparatus 100 (while the coupling capacitance Cm is at a first predetermined value), and the broken line indicates a case after the electric power receiving apparatus 200 has been removed from the electric power transmitting apparatus 100 (when the coupling capacitance Cm is at a second predetermined value). The coupling capacitance Cm decreases as the electric power receiving apparatus 200 is removed from the electric power transmitting apparatus 100. As a result, the low frequency side and high frequency side resonant frequencies shift to f1c' and f2c', which are at a higher frequency side than f1c and f2c held prior to the electric power receiving apparatus 200 being removed from the electric power transmitting apparatus 100. The low frequency side resonant frequency, however, does not shift toward the high frequency side beyond the operating frequency f3. In addition, the high frequency side resonant frequency shifts toward the high frequency side, or in other words, in a direction opposite to the operating frequency f3. Therefore, even if the high frequency side and low frequency side resonant frequencies change due to a change (decrease) in the coupling capacitance Cm caused as the electric power receiving apparatus 200 is removed from the electric power transmitting apparatus 100, the operating frequency f3 does not match (overlap) the high frequency side or low frequency side resonant frequencies. Accordingly, a high voltage across the electric power receiving electrodes (overvoltage) at the resonant frequency is not applied to the load circuit 60, and the load circuit 60 can be prevented from being damaged.

3. Recapitulation

The electric power transmitting system according to the present embodiment wirelessly transmits electric power between the electric power transmitting apparatus 100 and the electric power receiving apparatus 200. The electric power transmitting apparatus 100 includes the pair of electric power transmitting electrodes 31 and 32 and the electric power transmitting apparatus side resonant circuit 20 that is provided between the power supply circuit 10 and the pair of electric power transmitting electrodes 31 and 32 and that applies an alternate current voltage across the pair of electric power transmitting electrodes 31 and 32. The electric power receiving apparatus 200 includes the load circuit 60, the pair of electric power receiving electrodes 41 and 42 that is provided in correspondence with the pair of electric power transmitting electrodes 31 and 32 of the electric power transmitting apparatus 100 and that generates the coupling capacitance Cm in accordance with the positional relationship with the pair of electric power transmitting electrodes 31 and 32, the electric power receiving apparatus side resonant circuit 50 that is provided between the load circuit 60 and the pair of electric power receiving electrodes 41 and 42 and that applies an alternate current voltage to the load circuit 60, and the overvoltage suppressing unit 70 that is connected in parallel to the electric power receiving apparatus side resonant circuit 50. The overvoltage suppressing unit 70 is formed by an impedance element. The impedance of the impedance element is set to such a value that a rise in the voltage across the pair of electric power receiving electrodes 41 and 42 is suppressed as compared to the case in which the impedance element is not connected, in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in the predetermined positional relationship during normal electric power transmission to substantially 0.

According to such a configuration, even if the resonant frequency at the side of the electric power receiving apparatus 200 changes along with a change in the distance between the electric power transmitting apparatus 100 and the electric power receiving apparatus 200 as the electric power receiving apparatus is removed from the electric power transmitting apparatus during electric power transmission, the high voltage across the electric power receiving electrodes at the resonant frequency is not applied to the load circuit 60. Accordingly, the electric power receiving apparatus 200 and the load circuit 60 included in the electric power receiving apparatus 200 can be prevented from being damaged.

It should be noted that Patent Document 1 discloses the electromagnetic induction type wireless electric power transmitting system in which, as a configuration for protecting the load circuit of the electric power receiving apparatus from an overvoltage, a fuse is provided between the electric power receiving coil of the electric power receiving apparatus and a rectifying circuit downstream from the electric power receiving coil and the fuse is caused to blow when the output voltage of the rectifying circuit becomes excessively high. The fuse that has blown once, however, is not restored, leading to a trouble of replacing the fuse in order to suppress another instance of an overvoltage.

On the other hand, in the present embodiment, the overvoltage suppressing unit 70 is formed by an impedance element, which is less likely to be damaged during a protective operation. Thus, special repair is not required after a protective operation, and the protective operation can be carried out repeatedly.

In addition, in the present embodiment, the impedance element shifts the low frequency side resonant frequency by a predetermined shift amount, and the predetermined shift amount is set to such a value that the low frequency side resonant frequency does not overlap a predetermined electric power transmitting frequency (operating frequency f3) in the process in which the coupling capacitance Cm changes from a value held while the electric power transmitting electrodes 31 and 32 and the electric power receiving electrodes 41 and 42 are in the predetermined positional relationship during normal electric power transmission to substantially zero.

According to such a configuration, because of the overvoltage suppressing unit 70, neither of the resonant frequencies generated in the electric power receiving apparatus side resonant circuit 50 overlaps the operating frequency f3. Thus, a high voltage across the electric power receiving electrodes at the resonant frequency is not applied to the load circuit 60. Accordingly, the electric power receiving apparatus 200 and the load circuit 60 included in the electric power receiving apparatus 200 can be prevented from being damaged.

In addition, in the present embodiment, the overvoltage suppressing unit 70 is formed by the capacitor Cx. According to such a configuration, the overvoltage suppressing unit 70 can be formed with ease and in a reduced size. Furthermore, an overvoltage can be suppressed only by additionally provided the capacitor Cx in an existing electric power receiving apparatus that does not include the capacitor Cx, or in other words, without making a major modification to the configuration of the existing electric power receiving apparatus.

In addition, in the present embodiment, the capacitance of the capacitor Cx is set so as to satisfy the relationship of f1<f3<f2 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in a predetermined positional relationship during normal electric power transmission to substantially 0, provided that the low frequency side resonant frequency generated in the electric power receiving apparatus side resonant circuit 50 when the electric power transmitting electrodes 31 and 32 and the electric power receiving electrodes 41 and 42 are made to undergo capacitive coupling is denoted by f1, the high frequency side resonant frequency is denoted by f2, and the operating frequency is denoted by f3.

According to such a configuration, neither of the low frequency side and high frequency side resonant frequencies overlaps the operating frequency in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are at a predetermined positional relationship during normal electric power transmission to substantially 0 as the electric power receiving apparatus 200 is removed from the electric power transmitting apparatus 100. In other words, the damage to the load circuit 60 can be advantageously prevented as described above. Furthermore, the operating frequency sits in an area between the low frequency side resonant frequency and the high frequency side resonant frequency, and thus a voltage across the electric power receiving electrodes necessary for efficiently transmitting electric power can be obtained. In other words, electric power can be transmitted efficiently.

In addition, in the present embodiment, the step-up transformer TR1 is connected between the power supply circuit 10 and the electric power transmitting electrodes, and the step-down transformer TR2 is connected between the load circuit 60 and the electric power receiving electrodes 41 and 42. According to such a configuration, electric power can be transmitted from the electric power transmitting electrodes 31 and 32 to the electric power receiving electrodes 41 and 42 at a high voltage. The use of the high voltage makes it possible to transmit large electric power even with a relatively small current flowing in a transmission path. When the current is small, a loss due to a resistance value in the transmission path can be reduced. Therefore, electric power can be transmitted with high efficiency.

It should be noted that, although the capacitance of the capacitor Cx is set to such a value that neither of the low frequency side and high frequency side resonant frequencies generated in the electric power receiving apparatus side resonant circuit 50 overlaps the operating frequency f3 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in a predetermined positional relationship during normal electric power transmission to substantially 0 in the present embodiment, the embodiment is not limited thereto. For example, the capacitance of the capacitor Cx may be set to such a value that the voltage across the electric power receiving electrodes does not reach such a high voltage that causes a damage to the electric power receiving electrode 200 even if each of the low frequency side and high frequency side resonant frequencies generated in the electric power receiving apparatus side resonant circuit 50 overlaps the operating frequency f3 in the process in which the coupling capacitance Cm between the electric power transmitting electrodes 31 and 32 and the electric power receiving electrodes 41 and 42 decreases from a value held while the electric power transmitting electrodes 31 and 32 and the electric power receiving electrodes 41 and 42 are in a predetermined positional relationship during normal electric power transmission.

Embodiment 2

Figure 4:
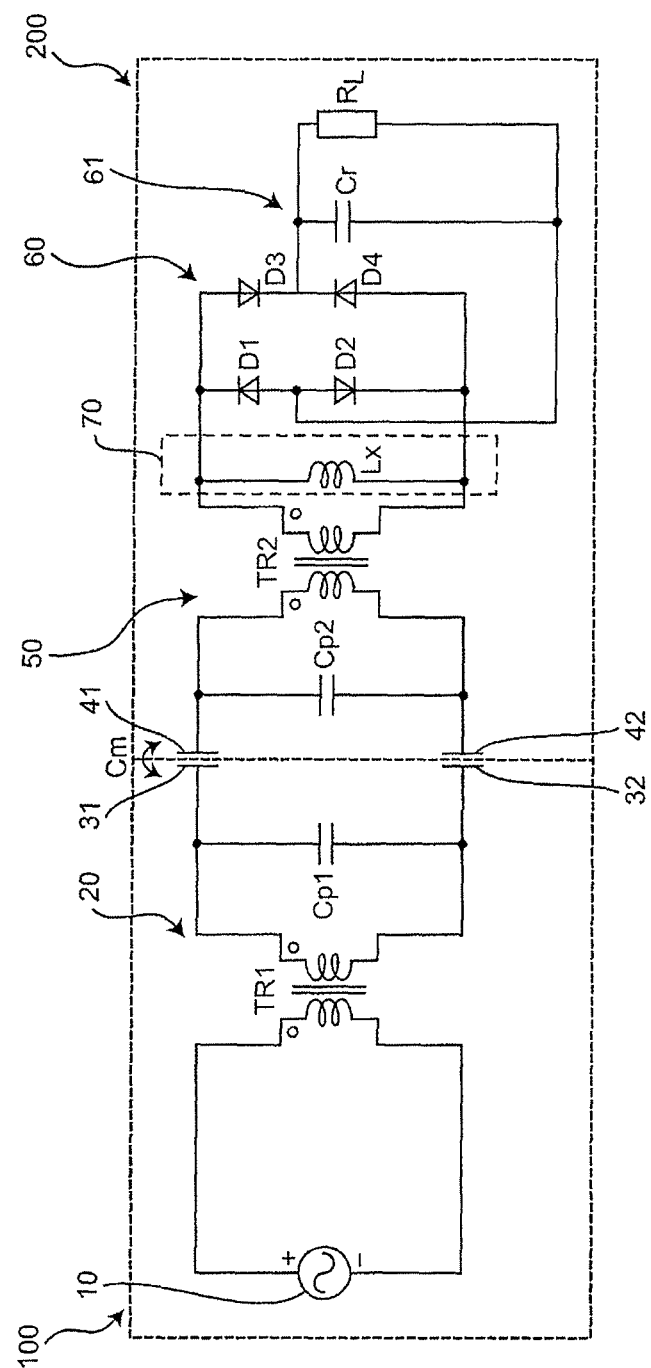
FIG. 4 illustrates a circuit configuration of a wireless electric power transmitting system according to Embodiment 2.

Embodiment 2 will now be described. FIG. 4 illustrates a circuit configuration of a wireless electric power transmitting system according to Embodiment 2.

In the present embodiment, the overvoltage suppressing unit 70 is formed by an inductor Lx. Other configurations of Embodiment 2 are identical to those of Embodiment 1. The inductor Lx prevents the low frequency side resonant frequency from overlapping the operating frequency so as to suppress occurrence of a high voltage in the electric power receiving apparatus 200.

The inductor Lx serving as the overvoltage suppressing unit 70 will be described. The inductor Lx shifts the low frequency side and high frequency side resonant frequencies generated in the electric power receiving apparatus side resonant circuit 50 toward the high frequency side. The inductance of the inductor Lx is set to such a value that the low frequency side resonant frequency is shifted toward the high frequency side by a predetermined shift amount. In the present embodiment, the predetermined shift amount is set to such an amount that the low frequency side resonant frequency does not overlap the operating frequency f3 even if the low frequency side resonant frequency moves in the process of removing the electric power receiving apparatus 200 placed on the electric power transmitting apparatus 100 so as to be sufficiently spaced apart from the electric power transmitting apparatus 100. Specifically, the inductance of the inductor Lx is set to such a value that neither of the low frequency side and high frequency side resonant frequencies generated in the electric power receiving apparatus side resonant circuit 50 overlaps the operating frequency f3 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in a predetermined positional relationship during normal electric power transmission to substantially 0. The low frequency side resonant frequency through capacitive coupling between the electric power transmitting electrodes 31 and 32 and the electric power receiving electrodes 41 and 42 is denoted by f1, the high frequency side resonant frequency is denoted by f2, and the operating frequency is denoted by f3. The inductance of the inductor Lx is set so as to satisfy the relationship of f3<f1<f2 in the process in which the coupling capacitance Cm changes from a value held while the electric power transmitting electrodes 31 and 32 and the electric power receiving electrodes 41 and 42 are in a predetermined positional relationship during normal electric power transmission to substantially 0.

Figure 5:
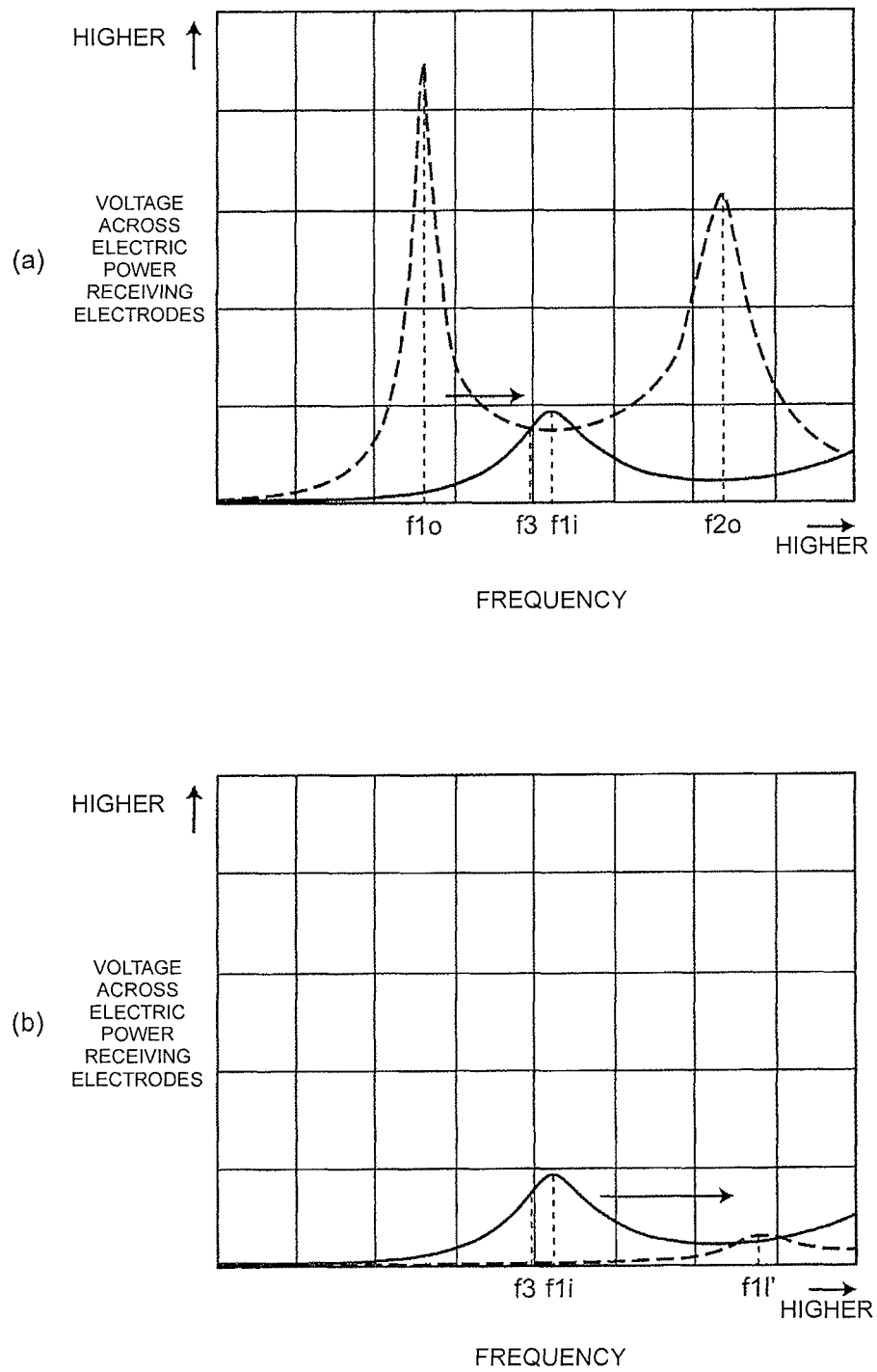
FIG. 5 illustrates an example of frequency characteristics of a voltage across an electric power receiving apparatus side active electrode and an electric power receiving apparatus side passive electrode in a state in which load impedance is high in the wireless electric power transmitting system according to Embodiment 2.

A specific example in which the inductance of the inductor Lx is set so as to satisfy the relationship of f3<f1<f2 will be described with reference to FIG. 5. FIG. 5 illustrates an example of the frequency characteristics of the voltage across the electric power receiving electrodes in a state in which the load RL (secondary battery) is substantially fully charged and the load impedance is high. Specifically, FIG. 5(a) illustrates a comparison of the characteristics in cases where the inductor Lx, serving as the overvoltage suppressing unit 70, is provided and is not provided, in which the solid line indicates the case in which the inductor Lx is provided, and the broken line indicates the case in which the inductor Lx is not provided. The low frequency side and high frequency side resonant frequencies are, respectively, f1o and f2o when the inductor Lx is not provided, but are, respectively, f1i and f2i, which are higher than f1o and f2o, when the inductor Lx is provided (in FIG. 5(a), f2i sits outside the drawing, further toward the high frequency side than f1i). In other words, the resonant frequency shifts toward the high frequency side as the inductor Lx is provided. At this point, the operating frequency f3 is lower to some extent than the low frequency side resonant frequency f1i. As the inductor Lx is provided, the voltage across the electric power receiving electrodes in the low frequency side resonant frequency f1i decreases further than in a case in which the inductor Lx is not provided, and is equal to or greater than a prescribed voltage necessary for efficiently transmitting electric power. Thus, electric power can be transmitted efficiently. In addition, the change in the voltage across the electric power receiving electrodes in the low frequency side resonant frequency f1i is more gradual than in a case in which the inductor Lx is not provided. Thus, even if the frequency characteristics of the voltage across the electric power receiving electrodes change to some extent, the variation in the voltage across the electric power receiving electrodes is small, and electric power can be transmitted stably.

FIG. 5(b) illustrates a change in the resonant frequency while the electric power receiving apparatus 200 is removed from the electric power transmitting apparatus 100 in a case in which the inductor Lx is provided. The solid line indicates a case before the electric power receiving apparatus 200 is removed from the electric power transmitting apparatus 100, and the broken line indicates a case after the electric power receiving apparatus 200 has been removed from the electric power transmitting apparatus 100. As the electric power receiving apparatus 200 is removed from the electric power transmitting apparatus 100, due to the decrease in the coupling capacitance Cm, the low frequency side and high frequency side resonant frequencies (the high frequency side resonant frequency sits outside the drawing in FIG. 5(b)) shift toward the high frequency side, namely, from f1i and f2i (in FIG. 5(b), f2i sits outside the drawing, further toward the high frequency side than f1i) held prior to the electric power receiving apparatus 200 being removed from the electric power transmitting apparatus 100 to f1i' and f2i' (in FIG. 5(b), f2i' sits outside the drawing, further toward the high frequency side than f1i'), or in other words, shift to a direction opposite to the operating frequency f3. Therefore, even if the high frequency side and low frequency side resonant frequencies change due to a change in the coupling capacitance Cm occurring when the electric power receiving apparatus 200 is removed from the electric power transmitting apparatus 100, the operating frequency f3 does not overlap the high frequency side or low frequency side resonant frequencies. Accordingly, the high voltage across the electric power receiving electrodes (overvoltage) at the resonant frequency is not applied to the load circuit 60, and the load circuit 60 can be prevented from being damaged.

In addition, according to the present embodiment, the overvoltage suppressing unit 70 is formed by the inductor Lx, and thus the overvoltage suppressing unit 70 is less likely to be damaged during a protective operation. Thus, special repair is not required after a protective operation, and the protective operation can be carried out repeatedly. Furthermore, the overvoltage suppressing unit 70 can be formed with ease and in a reduced size.

It should be noted that, although the inductance of the inductor Lx is set to such a value that neither of the low frequency side and high frequency side resonant frequencies generated in the electric power receiving apparatus side resonant circuit 50 overlaps the operating frequency f3 in the process in which the coupling capacitance Cm between the electric power transmitting electrodes 31 and 32 and the electric power receiving electrodes 41 and 42 changes from a value held while the electric power transmitting electrodes 31 and 32 and the electric power receiving electrodes 41 and 42 are in a predetermined positional relationship during normal electric power transmission to substantially 0 in the present embodiment, the embodiment is not limited thereto. For example, the inductance of the inductor Lx may be set to such a value that the voltage across the electric power receiving electrodes does not reach such a high voltage that causes a damage to the electric power receiving electrode 200 even if each of the low frequency side and high frequency side resonant frequencies generated in the electric power receiving apparatus side resonant circuit 50 overlaps the operating frequency f3 in the process in which the coupling capacitance Cm decreases from a value held while the electric power transmitting electrodes 31 and 32 and the electric power receiving electrodes 41 and 42 are in a predetermined positional relationship during normal electric power transmission.

It should be noted that the predetermined shift amount is not limited to the value described above. For example, if, by shifting the low frequency side resonant frequency toward the high frequency side by a predetermined shift amount, the voltage of electric power received when the low frequency side resonant frequency overlaps the operating frequency f3 in the process of removing the electric power receiving apparatus 200 placed on the electric power transmitting apparatus 100 so as to be sufficiently spaced apart from the electric power transmitting apparatus 100 becomes such a low voltage that does not cause a damage to the electric power receiving apparatus 200, that shift amount may be set as the predetermined shift amount.

Embodiment 3

Figure 6:
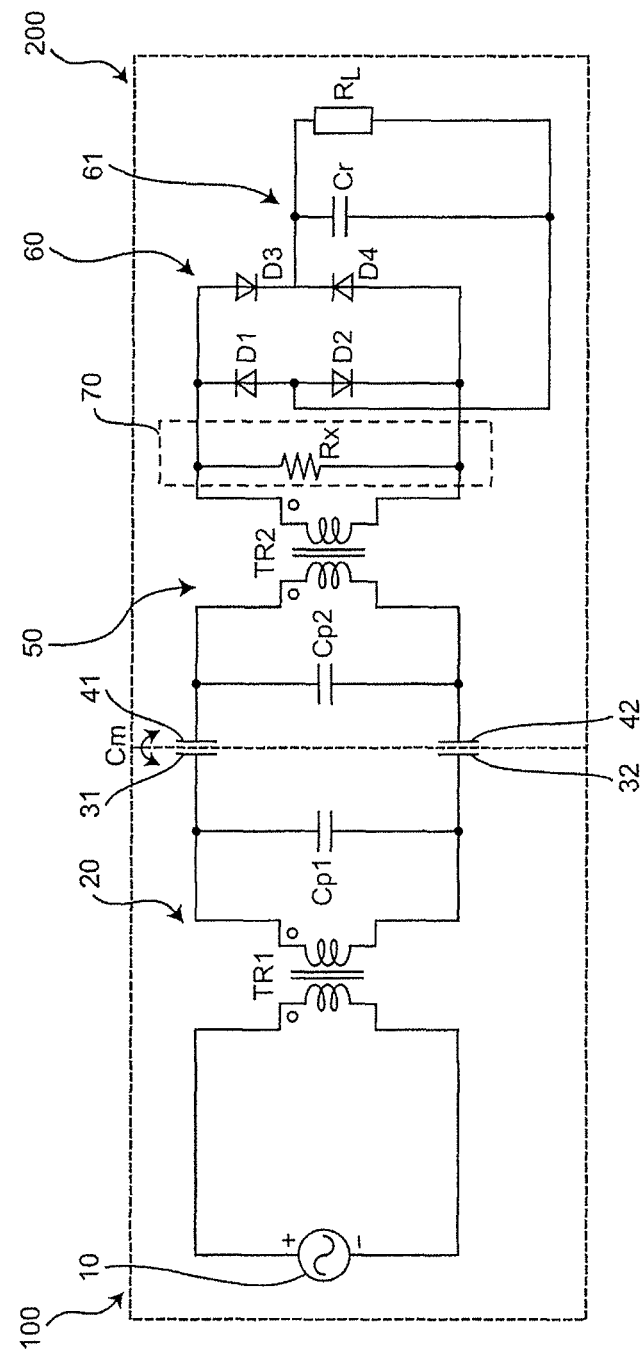
FIG. 6 illustrates a circuit configuration of a wireless electric power transmitting system according to Embodiment 3.

Embodiment 3 will now be described. FIG. 6 illustrates a circuit configuration of a wireless electric power transmitting system according to Embodiment 3.

In the present embodiment, the overvoltage suppressing unit 70 is formed by a resistor Rx (impedance element). Other configurations of Embodiment 3 are identical to those of Embodiment 1. The resistor Rx reduces the impedance of the load device 60 seen from the electric power receiving apparatus side resonant circuit 50 of the electric power receiving apparatus 200 as compared to a case in which the resistor Rx is not provided, and thus occurrence of a high voltage in the electric power receiving apparatus 200 is suppressed.

The resistance value of the resistor Rx is set to such a value that the voltage across the electric power receiving electrodes does not reach such a high voltage that causes malfunctioning of the electric power receiving apparatus 200 even if the low frequency side resonant frequency and the high frequency side resonant frequency change so as to match the operating frequency. The resistance value of the resistor Rx is, for example, set to a value that is smaller than the impedance of the electric power receiving apparatus side resonant circuit 50, and reduces the impedance at the secondary side of the electric power receiving apparatus side resonant circuit 50 at the low frequency side resonant frequency and the high frequency side resonant frequency. For example, the resistance value of the resistor Rx is set to 10 to 100Ω. Through this, the voltage at the secondary side of the electric power receiving apparatus side resonant circuit 50 decreases, and the voltage applied to the load circuit 60 is in turn reduced, preventing the load circuit 60 from being damaged.

As the overvoltage suppressing unit 70 is formed by the resistor Rx in this manner, the impedance of the entire system can be reduced as compared to a case in which the resistor Rx is not provided. In particular, as the resistance value of the resistor Rx is set to 10 to 100Ω, the impedance at the secondary side of the electric power receiving apparatus side resonant circuit 50 can be reduced more reliably than in a case in which the resistor Rx is not provided. Therefore, even if the high frequency side and low frequency side resonant frequencies change due to a change (decrease) in the coupling capacitance Cm occurring as the electric power receiving apparatus 200 is removed from the electric power transmitting apparatus 100 and match the operating frequency, the high voltage across the electric power receiving electrodes (overvoltage) is not applied to the load circuit 60. Accordingly, the load circuit 60 can be prevented from being damaged.

In addition, according to the present embodiment, the overvoltage suppressing unit 70 is formed by the resistor Rx, and thus the overvoltage suppressing unit 70 is less likely to be damaged during a protective operation. Thus, special repair is not required after a protective operation, and the protective operation can be carried out repeatedly. Furthermore, the overvoltage suppressing unit 70 can be formed with ease and in a reduced size.

Embodiment 4

Figure 7:
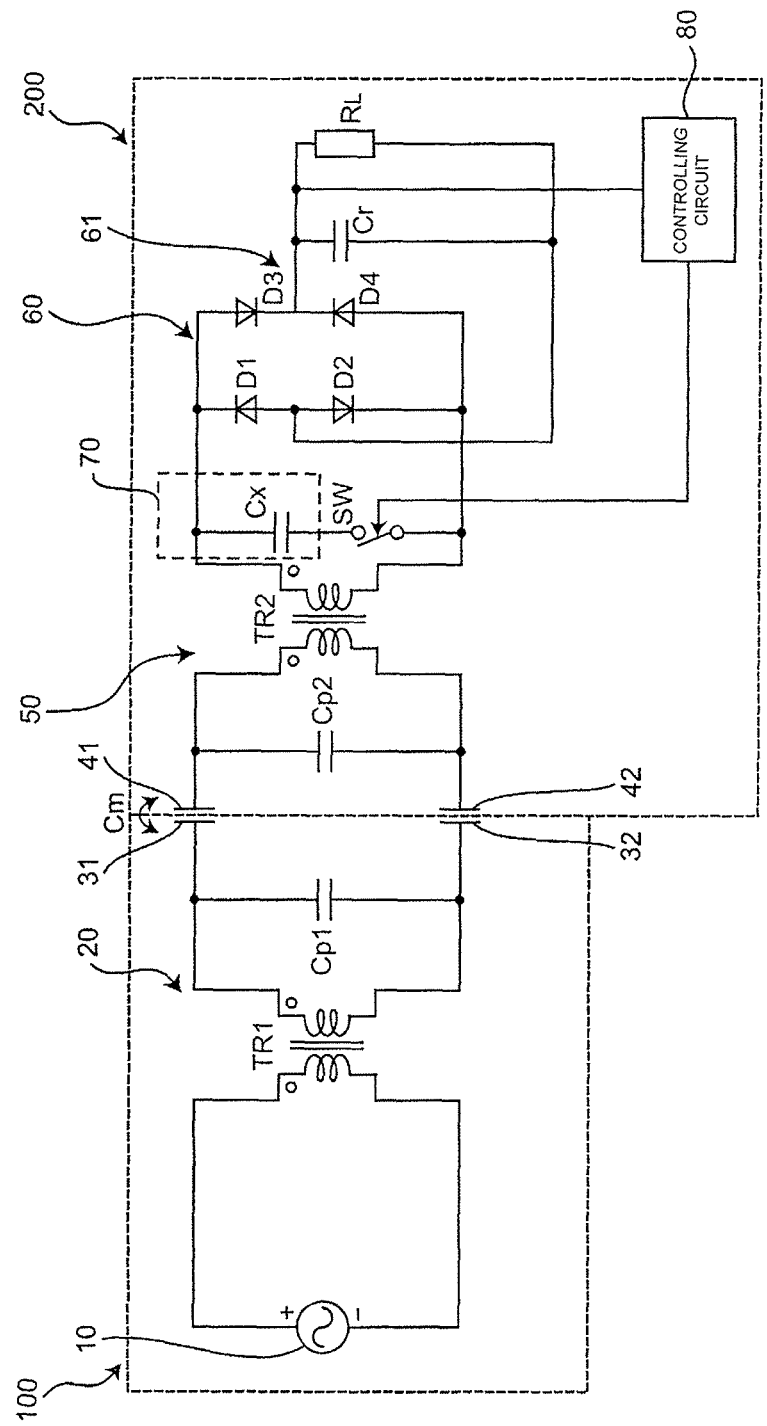
FIG. 7 illustrates a circuit configuration of a wireless electric power transmitting system according to Embodiment 4.

Embodiment 4 will now be described. FIG. 7 illustrates a circuit configuration of a wireless electric power transmitting system according to Embodiment 4.

In the present embodiment, the overvoltage suppressing unit 70 is formed by the capacitor Cx, and a switching element SW is provided in series with the capacitor Cx. In addition, a controlling circuit 80 that detects an input voltage to the load RL which has been rectified by the rectifying circuit 61 (hereinafter, referred to as a "load input voltage," as appropriate) and controls ON/OFF of the switching element SW on the basis of the detected load input voltage is provided. Other configurations of Embodiment 4 are identical to those of Embodiment 1.

The controlling circuit 80 controls the switching element SW to ON if the detected load input voltage is equal to or higher than a predetermined voltage and otherwise controls the switching element SW to OFF. The predetermined voltage may be set, as appropriate, in accordance with a withstanding voltage or the like of the load circuit 60.

It should be noted that the capacitance of the capacitor Cx is set in a similar manner to that of Embodiment 1.

According to such a configuration, the switching element SW is controlled to ON and the capacitor Cx is connected when the coupling capacitance Cm decreases as the electric power receiving apparatus 200 is removed from the electric power transmitting apparatus 100 so that the low frequency side resonant frequency approaches the operating frequency and the load input voltage rises to or exceeds the predetermined voltage. Through this, each of the low frequency side and high frequency side resonant frequencies shifts toward the low frequency side. As a result, the low frequency side resonant frequency can be prevented from overlapping the operating frequency, and as in each of the embodiments described above, the high voltage across the electric power receiving electrodes (overvoltage) at the resonant frequency is not applied to the load circuit 60, making it possible to prevent the load circuit 60 from being damaged.

Figure 8:
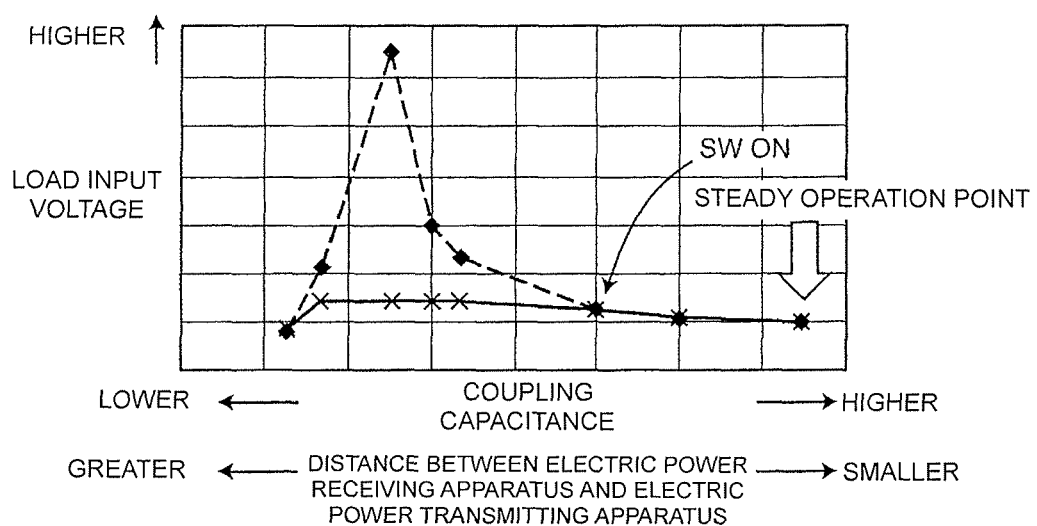
FIG. 8 illustrates characteristics of a load input voltage in relation to coupling capacitance in the wireless electric power transmitting system according to Embodiment 4.

FIG. 8 illustrates characteristics of the load input voltage in relation to the coupling capacitance Cm in the wireless electric power transmitting system according to Embodiment 4. The broken line indicates the characteristics in a case in which the capacitor Cx and the switching element SW are not provided. According to the present embodiment, the switching element SW is controlled to ON upon the load input voltage rising to or exceeding the predetermined voltage, and thus a jump in the load input voltage can be suppressed so as to stabilize the load input voltage.

As described above, according to the present embodiment, in addition to the configuration of Embodiment 1, the controlling circuit 80 (voltage detecting circuit) and the switching element SW are provided. The controlling circuit 80 detects the load input voltage at the secondary side of the rectifying circuit 61 forming the load circuit 60 and outputs a control signal for turning on the switching element SW in a case in which the detected load input voltage is equal to or higher than the predetermined voltage, and the switching element SW switches the connection of the capacitor Cx to ON upon receiving the control signal.

Through this, the switching element SW is controlled to ON upon the load input voltage rising to or exceeding the predetermined voltage, and thus a jump in the load input voltage can be suppressed so as to stabilize the load input voltage.

Here, if the capacitor Cx is connected even during normal electric power transmission, the voltage across the electric power receiving electrodes decreases and the electric power transmission efficiency is reduced in turn. According to the present embodiment, however, the capacitor Cx is connected only when the load input voltage rises to or exceeds the predetermined voltage, and thus the reduction in the transmission efficiency can be prevented.

Embodiment 5

Figure 9:
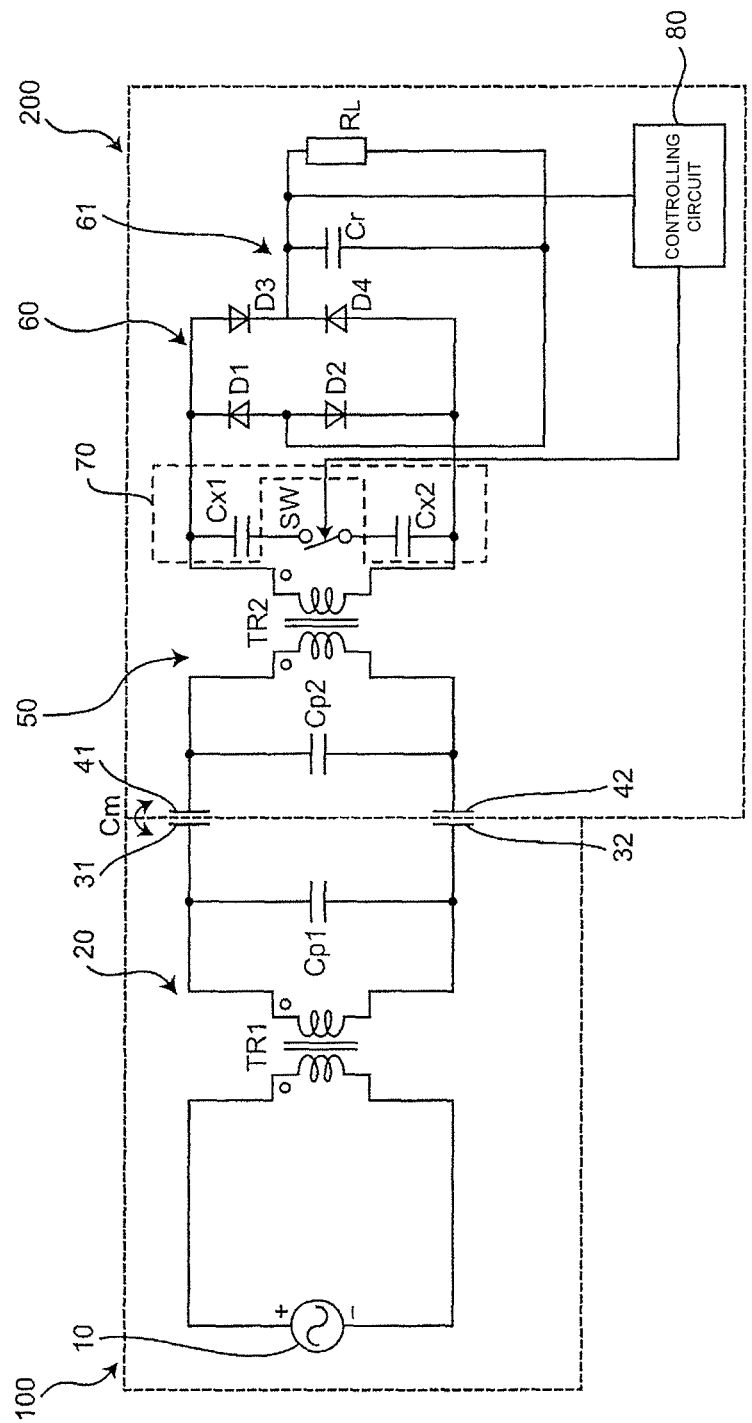
FIG. 9 illustrates a circuit configuration of a wireless electric power transmitting system according to Embodiment 5.

Embodiment 5 will now be described. FIG. 9 illustrates a circuit configuration of a wireless electric power transmitting system according to Embodiment 5.

In the present embodiment, the overvoltage suppressing unit 70 is formed by two capacitors Cx1 and Cx2, which are provided in series, and the switching element SW is provided between the capacitors Cx1 and Cx2. In addition, the controlling circuit 80 that detects the load input voltage that has been rectified by the rectifying circuit 61 and controls ON/OFF of the switching element SW on the basis of the detected voltage is provided. Other configurations of Embodiment 5 are identical to those of Embodiment 1.

Through such a configuration, an effect similar to that of Embodiment 4 can be obtained. It should be noted that a case in which the overvoltage suppressing unit 70 is formed by the single capacitor Cx has been described in Embodiment 4, and a case in which the overvoltage suppressing unit 70 is formed by the two capacitors Cx1 and Cx2 has been described in Embodiment 5. The overvoltage suppressing unit 70, however, can also be formed by three or more capacitors.

Figure 10:
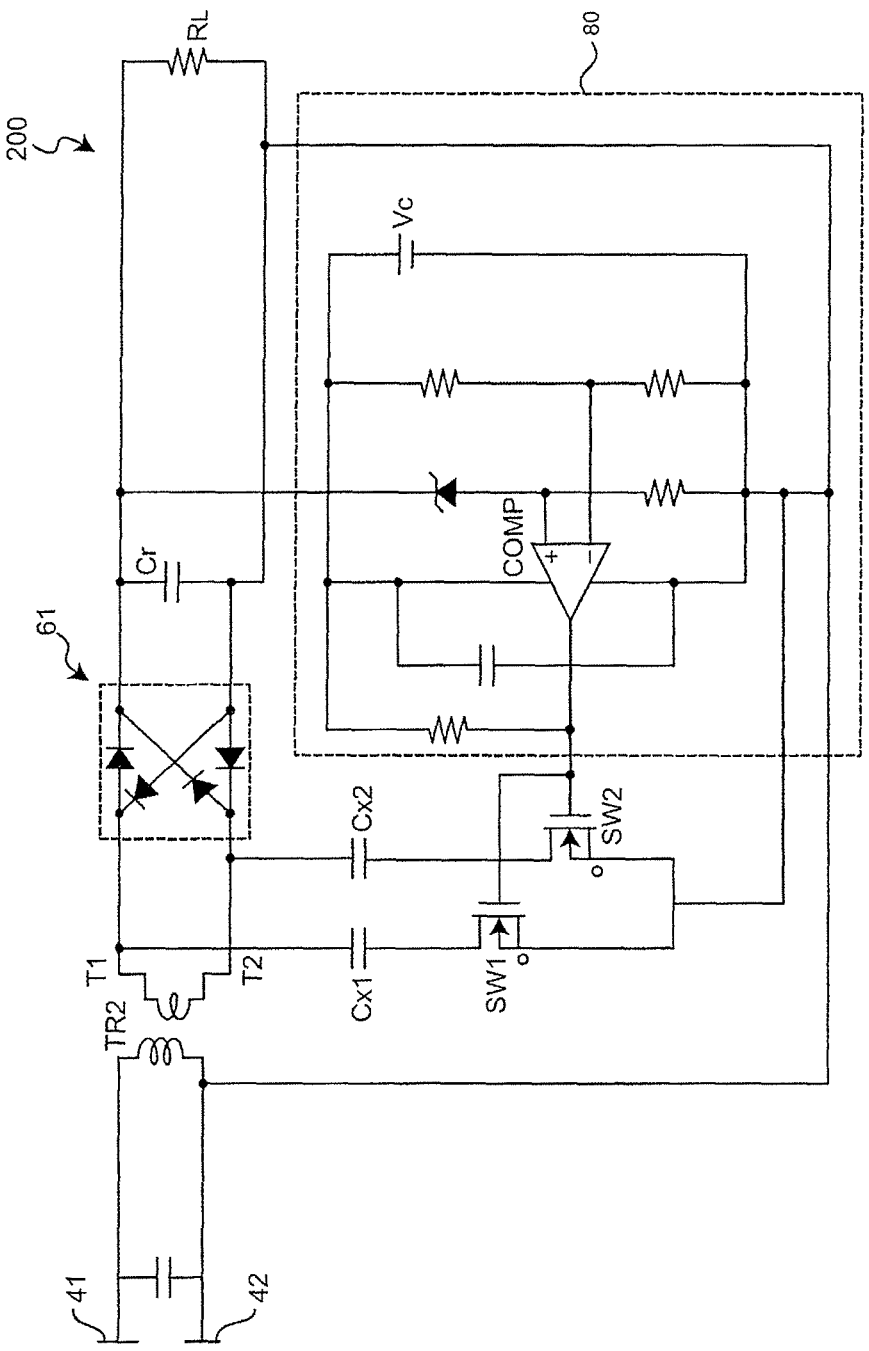
FIG. 10 illustrates a more specific circuit configuration of a controlling circuit in an electric power receiving apparatus of the wireless electric power transmitting system according to Embodiment 5.
Figure 11:
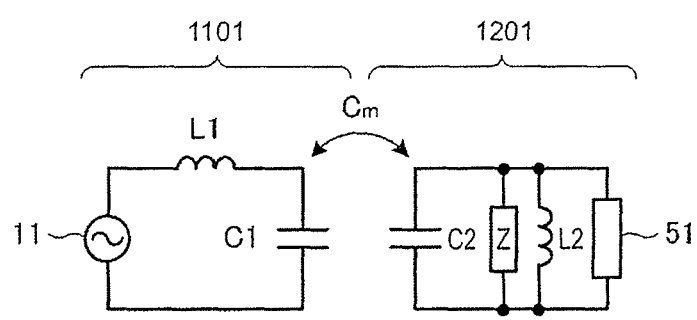
FIG. 11 is an equivalent circuit diagram of an existing wireless electric power transmitting system.
Figure 12:
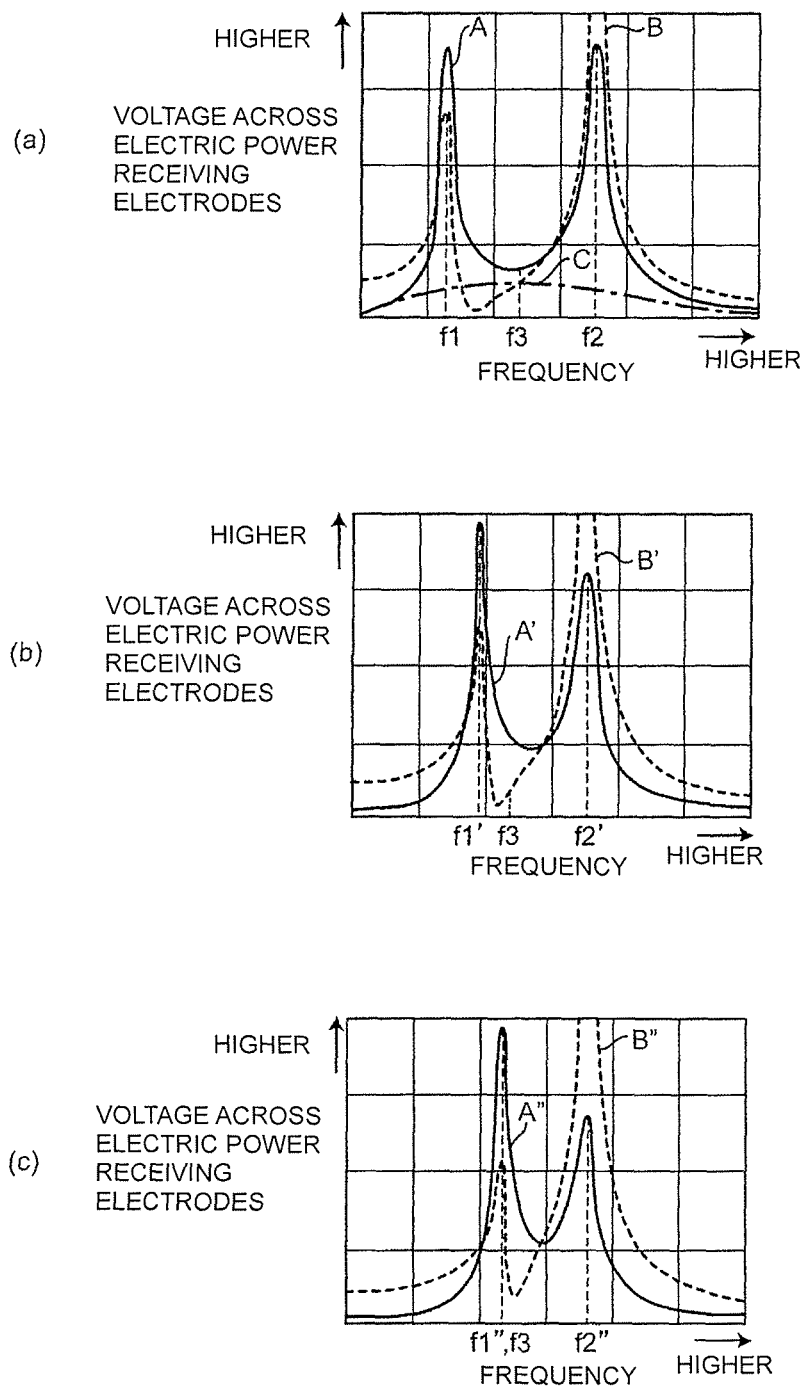
FIG. 12 illustrates changes in the frequency characteristics of a voltage across an electric power receiving apparatus side active electrode and an electric power receiving apparatus side passive electrode and of a voltage across an electric power transmitting apparatus side active electrode and an electric power transmitting apparatus side passive electrode in the process of removing an electric power receiving apparatus from an electric power transmitting apparatus in an existing electric field coupling type wireless electric power transmitting system.

FIG. 10 illustrates a specific configuration of the controlling circuit 80.

A series circuit formed by the capacitor Cx1 and a switching element SW1 is connected to one output end T1 of the step-down transformer TR2, and a series circuit formed by the capacitor Cx2 and a switching element SW2 is connected to another output end T2.

The controlling circuit 80 includes a comparator COMP, a voltage source Vc, and so on. The comparator COMP compares a reference voltage obtained by dividing an output voltage of the voltage source Vc and a voltage of the ripple removing capacitor Cr of the rectifying circuit 61. The comparator COMP then outputs an ON signal to each of the switching elements SW1 and SW2 when the voltage of the ripple removing capacitor Cr reaches or exceeds the reference voltage.

Through such a configuration, the controlling circuit 80 can be implemented with a simple configuration. Aside from this circuit, the operation can be stabilized by having hysteresis. Although FETs are used as the switching elements, the embodiment is not limited thereto, and a switching element formed by an electromagnetic relay or the like can also be employed.

Other Embodiments

It should be noted that the configuration that includes a switching element as described in Embodiments 4 and 5 can be employed for the purpose of other than suppressing the voltage variation occurring at the time of removal. For example, the resonance condition can be changed by controlling the switching element during the normal operation. In other words, the configuration can be used as a limiter for changing the voltage to be outputted to a later-stage circuit so as to narrow the range of the input voltage of the later-stage circuit.

Although a case in which the impedance element serving as the overvoltage suppressing unit is formed by a capacitor has been described in Embodiments 4 and 5, the concept in Embodiments 4 and 5 can also be applied to a case in which the impedance element serving as the overvoltage suppressing unit is formed by an inductor or a resistor.

Figure 13:
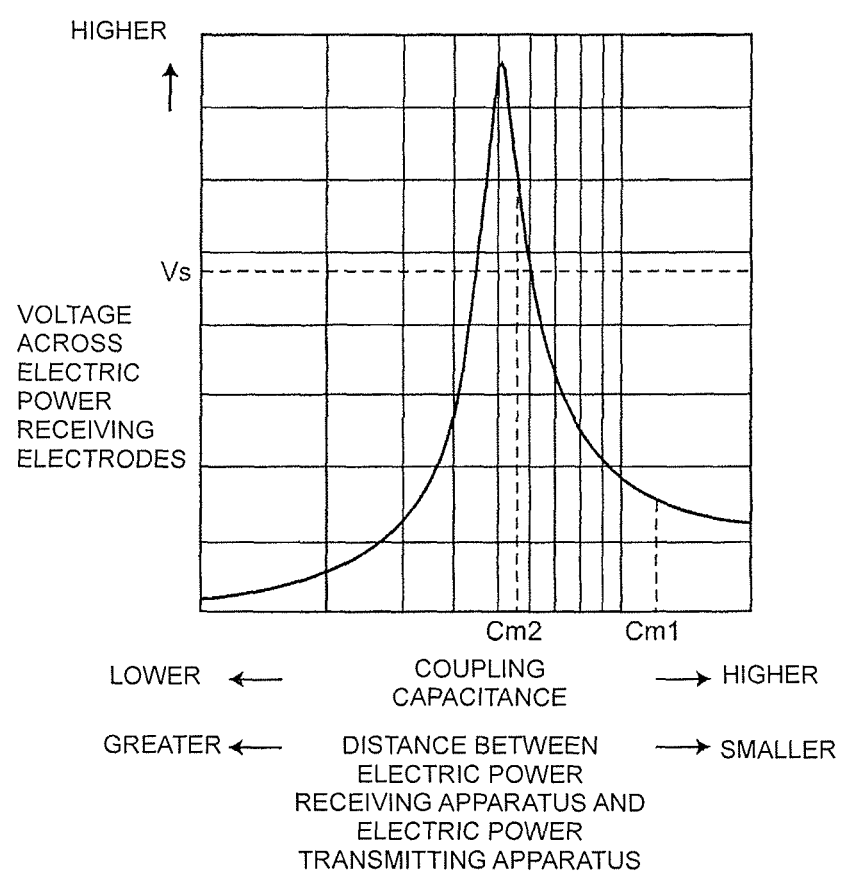
FIG. 13 illustrates characteristics of a voltage across an electric power receiving apparatus side active electrode and an electric power receiving apparatus side passive electrode in relation to coupling capacitance.

Although a case in which the load impedance becomes high as the secondary battery serving as the load circuit becomes substantially fully charged in each of the embodiments described above, the present invention is not limited thereto. For example, the present invention can be applied to a case that exhibits the characteristics as illustrated in FIG. 13 in which the load circuit is not a secondary battery but the load impedance is steadily high or temporarily becomes high. Although the overvoltage suppressing unit 70 is provided in parallel to the secondary side of the step-down transformer TR2 in each of the embodiments described above, the overvoltage suppressing unit 70 may be provided at a primary side of the step-down transformer TR2. In a case in which the overvoltage suppressing unit 70 is provided at the primary side of the transformer TR2, the capacitor in the overvoltage suppressing unit 70 needs to be designed for a high withstanding voltage.

REFERENCE SIGNS LIST

10 POWER SUPPLY CIRCUIT
20 ELECTRIC POWER TRANSMITTING APPARATUS SIDE RESONANT CIRCUIT
31 ELECTRIC POWER TRANSMITTING APPARATUS SIDE PASSIVE ELECTRODE
32 ELECTRIC POWER TRANSMITTING APPARATUS SIDE ACTIVE ELECTRODE
41 ELECTRIC POWER RECEIVING APPARATUS SIDE PASSIVE ELECTRODE
42 ELECTRIC POWER RECEIVING APPARATUS SIDE ACTIVE ELECTRODE
50 ELECTRIC POWER RECEIVING APPARATUS SIDE RESONANT CIRCUIT
60 LOAD CIRCUIT
61 RECTIFYING CIRCUIT
70 OVERVOLTAGE SUPPRESSING UNIT
80 CONTROLLING CIRCUIT
100 ELECTRIC POWER TRANSMITTING APPARATUS
200 ELECTRIC POWER RECEIVING APPARATUS
Cp1 CAPACITOR
Cp2 CAPACITOR
Cx, Cx1, Cx2 CAPACITORS
Lx INDUCTOR
Rx RESISTOR
RL LOAD
SW, SW1, SW2 SWITCHING ELEMENTS
TR1 STEP-UP TRANSFORMER
TR2 STEP-DOWN TRANSFORMER

The invention claimed is:

1. An electric power receiving apparatus that receives electric power transmitted from a power transmitting apparatus that includes a power supply circuit that generates an AC voltage of a predetermined transmitting frequency, at least one pair of power transmitting electrodes, and a resonant circuit coupled between the power supply circuit and the at least one pair of power transmitting electrodes and that applies the AC voltage across the at least one pair of power transmitting electrodes, the power receiving apparatus comprising:
   a load circuit;
   at least one pair of power receiving electrodes that generate a coupling capacitive coupling with the at least one pair of power transmitting electrodes when the power receiving apparatus is positioned adjacent the power transmitting apparatus;
   a resonant circuit coupled between the load circuit and the at least one pair of power receiving electrodes that applies the AC voltage to the load circuit; and
   an overvoltage suppressing circuit comprising an impedance element and coupled in parallel to the resonant circuit of the power receiving apparatus, the impedance element having an impedance value that suppresses an increase in a voltage across the at least one pair of power receiving electrodes when a value of the coupling capacitance decreases.

2. The electric power receiving apparatus according to claim 1, wherein the impedance element has an impedance value that suppresses the increase in the voltage across the at least one pair of power receiving electrodes when the coupling capacitance changes from a set value while the power transmitting electrodes and the power receiving electrodes are in a predetermined positional relationship during power transmission to substantially zero.

3. The electric power receiving apparatus according to claim 1, wherein two resonant frequencies are generated as the resonant circuit of the power transmitting apparatus and the resonant circuit of the power receiving apparatus undergo capacitive coupling through the coupling capacitance, and wherein the impedance element shifts a low frequency side resonant frequency by a predetermined shift amount.

4. The electric power receiving apparatus according to claim 3, wherein the predetermined shift amount is a value such that the low frequency side resonant frequency does not overlap the predetermined transmitting frequency when the coupling capacitance changes from a set value while the power transmitting electrodes and the power receiving electrodes are in the predetermined positional relationship during electric power transmission to substantially zero.

5. The electric power receiving apparatus according to claim 1, wherein the impedance element lowers impedance of the load circuit relative to the resonant circuit compared to when the impedance element is not connected.

6. The electric power receiving apparatus according to claim 1, wherein the overvoltage suppressing unit comprises a capacitor.

7. The electric power receiving apparatus according to claim 6,
wherein the capacitor has a capacitance value that satisfies a relationship of f1<f3<f2 when the coupling capacitance between the power transmitting electrodes and the power receiving electrodes changes from a set value while the power transmitting electrodes and the power receiving electrodes are in the predetermined positional relationship during electric power transmission to substantially zero, and
wherein a low frequency side resonant frequency generated in the resonant circuit when the power transmitting electrodes and the power receiving electrodes undergo capacitive coupling is denoted by f1, a high frequency side resonant frequency is denoted by f2, and the predetermined transmitting frequency is denoted by D.

8. The electric power receiving apparatus according to claim 1, wherein the overvoltage suppressing unit comprises an inductor.

9. The electric power receiving apparatus according to claim 8,
wherein the inductor has an inductance value to satisfy a relationship of f3<f1<f2 when the coupling capacitance between the power transmitting electrodes and the power receiving electrodes changes from a set value while the power transmitting electrodes and the power receiving electrodes are in the predetermined positional relationship during electric power transmission to substantially zero, and
wherein a low frequency side resonant frequency generated in the resonant circuit when the power transmitting electrodes and the power receiving electrodes undergo capacitive coupling is denoted by f1, a high frequency side resonant frequency is denoted by f2, and the predetermined electric power transmitting frequency is denoted by f3.

10. The electric power receiving apparatus according to claim 1, wherein the overvoltage suppressing unit comprises a resistor.

11. The electric power receiving apparatus according to claim 10, wherein a resistance value of the resistor is set in a range from 10 to 100Ω.

12. The electric power receiving apparatus according to claim 1, further comprising:
a switching element coupled in series with the overvoltage suppressing unit; and
a controlling circuit that detects a voltage at a secondary side of a rectifying circuit forming the load circuit and that controls the switching element to ON when the detected voltage is equal to or higher than a predetermined voltage.

13. The electric power receiving apparatus according to claim 1,
wherein the resonant circuit of the power transmitting apparatus includes a step-up transformer, and
wherein the resonant circuit of the power receiving apparatus includes a step-down transformer.

14. An electric power transmitting system, comprising:
an electric power transmitting apparatus including:
a power supply circuit that generates an AC voltage of a predetermined frequency,
at least one pair of power transmitting electrodes, and
a resonant circuit coupled between the power supply circuit and the at least one pair of electric power transmitting electrodes and that applies the AC voltage across the at least one pair of power transmitting electrodes; and
a power receiving apparatus comprising:
a load circuit;
at least one pair of power receiving electrodes that generate a coupling capacitive coupling with the at least one pair of power transmitting electrodes;
a resonant circuit coupled between the load circuit and the at least one pair of power receiving electrodes that applies the AC voltage to the load circuit; and
an overvoltage suppressing circuit comprising an impedance element and coupled in parallel to the resonant circuit of the power receiving apparatus, the impedance element having an impedance value that suppresses an increase in a voltage across the at least one pair of power receiving electrodes when a value of the coupling capacitance decreases.

15. The electric power transmitting system according to claim 14, wherein the impedance element has an impedance value that suppresses the increase in the voltage across the at least one pair of power receiving electrodes when the coupling capacitance changes from a set value while the power transmitting electrodes and the power receiving electrodes are in a predetermined positional relationship during power transmission to substantially zero.

16. The electric power transmitting system according to claim 14,
wherein the overvoltage suppressing unit comprises a capacitor having a capacitance value that satisfies a relationship of f1<f3<f2 when the coupling capacitance between the power transmitting electrodes and the power receiving electrodes changes from a set value while the power transmitting electrodes and the power receiving electrodes are in the predetermined positional relationship during electric power transmission to substantially zero, and
wherein a low frequency side resonant frequency generated in the resonant circuit when the power transmitting electrodes and the power receiving electrodes undergo capacitive coupling is denoted by f1, a high frequency side resonant frequency is denoted by f2, and the predetermined frequency is denoted by f3.

17. The electric power transmitting system according to claim 14,
wherein the overvoltage suppressing unit comprises an inductor having an inductance value that satisfies a relationship of f3<f1<f2 when the coupling capacitance between the power transmitting electrodes and the power receiving electrodes changes from a set value while the power transmitting electrodes and the power receiving electrodes are in the predetermined positional relationship during electric power transmission to substantially zero, and
wherein a low frequency side resonant frequency generated in the resonant circuit when the power transmitting electrodes and the power receiving electrodes undergo capacitive coupling is denoted by f1, a high frequency side resonant frequency is denoted by f2, and the predetermined frequency is denoted by f3.

18. The electric power transmitting system according to claim 14, wherein the overvoltage suppressing unit comprises a resistor having a resistance value in a range from 10 to 100Ω.

* * * * *